(12) United States Patent
Onsager et al.

(10) Patent No.: US 8,626,403 B2
(45) Date of Patent: Jan. 7, 2014

(54) ENERGY MANAGEMENT AND STORAGE SYSTEM

(75) Inventors: Michael Gordon Onsager, Franklin, WI (US); Joseph Helfrich, Milwaukee, WI (US); Dave L. Perugini, Kenosha, WI (US); Wayne George Chmiel, Norway, WI (US); Robert Weber, Wadsworth, IL (US); Peter James Miller, Brookfield, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 477 days.

(21) Appl. No.: 12/899,375

(22) Filed: Oct. 6, 2010

(65) Prior Publication Data
US 2012/0089279 A1 Apr. 12, 2012

(51) Int. Cl.
*B60W 10/24* (2006.01)

(52) U.S. Cl.
USPC ....... 701/50; 701/22; 180/65.265; 180/65.27; 180/65.275; 180/65.285; 180/65.31; 318/140; 903/902; 903/903; 903/906

(58) Field of Classification Search
USPC ............. 701/22, 50; 180/65.1, 65.265, 65.27, 180/65.275, 65.28, 65.285, 65.31; 318/139, 318/140; 903/902, 903, 904, 906
See application file for complete search history.

(56) References Cited

U.S. PATENT DOCUMENTS

| | | |
|---|---|---|
| 3,425,574 A | 2/1969 | Willgrubs et al. |
| 3,891,354 A | 6/1975 | Bosch |
| 4,050,478 A | 9/1977 | Virtue et al. |

(Continued)

FOREIGN PATENT DOCUMENTS

| | | |
|---|---|---|
| DE | 22 51 904 | 4/1974 |
| DE | 23 31 617 | 1/1975 |

(Continued)

OTHER PUBLICATIONS

International Search Report and Written Opinion for International Application No. PCT/US2011/057491, mail date May 18, 2012, 9 pages.

(Continued)

*Primary Examiner* — Thomas Black
*Assistant Examiner* — Peter D Nolan
(74) *Attorney, Agent, or Firm* — Foley & Lardner LLP

(57) ABSTRACT

Heavy equipment is designed for operation in a substantially-repetitive work cycle that includes lifting, rotating, and lowering steps. The heavy equipment includes a generator, an electrical bus, an energy storage component, and working components. The generator provides a substantially constant electrical output to the electrical bus, which is communicated to the working components. As such, the working components of the heavy equipment are driven directly or indirectly by the electrical output of the generator. The controller selectively couples the energy storage component to the electrical bus, and the energy storage component is configured to store electricity provided by the generator, and to provide electricity to the working components by way of the electrical bus. The electrical output of the generator is less than the power used by the heavy equipment during a portion of the work cycle, and the controller couples the energy storage component to the electrical bus to supplement the electrical output of the generator during the portion of the work cycle in which the electrical output of the generator is less than the power used by the working components of the heavy equipment.

20 Claims, 8 Drawing Sheets

(56) References Cited

U.S. PATENT DOCUMENTS

| | | | |
|---|---|---|---|
| 4,230,022 A | 10/1980 | Bianchetta et al. | |
| 4,533,900 A | 8/1985 | Muhlberger et al. | |
| 4,606,313 A | 8/1986 | Izumi et al. | |
| 4,763,473 A | 8/1988 | Ziplies et al. | |
| 4,875,337 A | 10/1989 | Sugiyama et al. | |
| 5,167,121 A | 12/1992 | Sepehri et al. | |
| 5,295,353 A | 3/1994 | Ikari | |
| 5,303,551 A | 4/1994 | Lee | |
| 5,563,351 A | 10/1996 | Miller | |
| 5,673,558 A | 10/1997 | Sugiyama et al. | |
| 5,722,190 A | 3/1998 | Arnold | |
| 5,852,934 A | 12/1998 | Chung et al. | |
| 5,890,303 A | 4/1999 | Ishikawa et al. | |
| 6,005,360 A | 12/1999 | Pace | |
| 6,087,945 A | 7/2000 | Yasuda | |
| 6,141,629 A | 10/2000 | Yamamoto et al. | |
| 6,148,548 A | 11/2000 | Tohji | |
| 6,164,069 A | 12/2000 | Takahashi et al. | |
| 6,164,388 A | 12/2000 | Martunovich et al. | |
| 6,175,217 B1 | 1/2001 | Da Ponte et al. | |
| 6,199,307 B1* | 3/2001 | Kagoshima et al. | 37/443 |
| 6,282,891 B1 | 9/2001 | Rockwood | |
| 6,323,608 B1 | 11/2001 | Ozawa | |
| 6,326,763 B1 | 12/2001 | King et al. | |
| 6,339,737 B1 | 1/2002 | Yoshimura et al. | |
| 6,422,001 B1 | 7/2002 | Sherman et al. | |
| 6,460,332 B1* | 10/2002 | Maruta et al. | 60/414 |
| 6,584,769 B1 | 7/2003 | Bruun | |
| 6,591,697 B2 | 7/2003 | Henyan | |
| 6,591,758 B2 | 7/2003 | Kumar | |
| 6,612,246 B2 | 9/2003 | Kumar | |
| 6,635,973 B1 | 10/2003 | Kagoshima et al. | |
| 6,650,091 B1 | 11/2003 | Shiue et al. | |
| 6,678,972 B2* | 1/2004 | Naruse et al. | 37/466 |
| 6,683,389 B2 | 1/2004 | Geis | |
| 6,708,787 B2* | 3/2004 | Naruse et al. | 180/53.8 |
| 6,725,581 B2 | 4/2004 | Naruse et al. | |
| 6,789,335 B1* | 9/2004 | Kinugawa et al. | 37/348 |
| 6,799,424 B2 | 10/2004 | Ioku et al. | |
| 6,810,362 B2 | 10/2004 | Adachi et al. | |
| 6,820,356 B2* | 11/2004 | Naruse et al. | 37/348 |
| 6,832,175 B2 | 12/2004 | Adachi et al. | |
| 6,864,663 B2* | 3/2005 | Komiyama et al. | 320/104 |
| 6,870,139 B2 | 3/2005 | Petrenko | |
| 6,876,098 B1 | 4/2005 | Gray, Jr. | |
| 6,907,384 B2 | 6/2005 | Adachi et al. | |
| 6,922,990 B2 | 8/2005 | Naruse et al. | |
| 6,962,050 B2* | 11/2005 | Hiraki et al. | 60/414 |
| 7,069,674 B2 | 7/2006 | Arii | |
| 7,078,825 B2 | 7/2006 | Ebrahim et al. | |
| 7,078,877 B2 | 7/2006 | Salasoo et al. | |
| 7,082,758 B2 | 8/2006 | Kageyama et al. | |
| 7,096,985 B2 | 8/2006 | Charaudeau et al. | |
| 7,146,808 B2 | 12/2006 | Devier et al. | |
| 7,174,826 B2 | 2/2007 | Kerrigan et al. | |
| 7,190,133 B2 | 3/2007 | King et al. | |
| 7,251,934 B2 | 8/2007 | Lech et al. | |
| 7,252,165 B1 | 8/2007 | Gruenwald et al. | |
| 7,258,183 B2 | 8/2007 | Leonardi et al. | |
| 7,275,369 B2 | 10/2007 | Kim | |
| 7,298,102 B2* | 11/2007 | Sopko et al. | 318/139 |
| 7,356,991 B2 | 4/2008 | Kim et al. | |
| 7,378,808 B2 | 5/2008 | Kuras et al. | |
| 7,386,978 B2 | 6/2008 | Ivantysynova et al. | |
| 7,398,012 B2 | 7/2008 | Koellner | |
| 7,401,464 B2 | 7/2008 | Yoshino | |
| 7,430,967 B2 | 10/2008 | Kumar | |
| 7,439,631 B2 | 10/2008 | Endou | |
| 7,444,809 B2* | 11/2008 | Smith et al. | 60/414 |
| 7,444,944 B2 | 11/2008 | Kumar et al. | |
| 7,448,328 B2 | 11/2008 | Kumar | |
| 7,456,509 B2 | 11/2008 | Gray, Jr. | |
| 7,479,757 B2 | 1/2009 | Ahmad | |
| 7,518,254 B2 | 4/2009 | Donnelly et al. | |
| 7,531,916 B2 | 5/2009 | Franklin et al. | |
| 7,532,960 B2 | 5/2009 | Kumar | |
| 7,533,527 B2 | 5/2009 | Naruse | |
| 7,560,904 B2 | 7/2009 | Alvarez-Troncoso | |
| 7,571,683 B2 | 8/2009 | Kumar | |
| 7,596,893 B2* | 10/2009 | Tozawa et al. | 37/348 |
| 7,628,236 B1 | 12/2009 | Brown | |
| 7,730,981 B2* | 6/2010 | McCabe et al. | 180/65.225 |
| 7,748,279 B2 | 7/2010 | Budde et al. | |
| 8,022,663 B2* | 9/2011 | Davis et al. | 320/104 |
| 2002/0104239 A1 | 8/2002 | Naruse et al. | |
| 2003/0089557 A1 | 5/2003 | Eilinger | |
| 2004/0021441 A1 | 2/2004 | Komiyama et al. | |
| 2004/0073468 A1 | 4/2004 | Vyas et al. | |
| 2005/0061561 A1 | 3/2005 | Leonardi et al. | |
| 2005/0139399 A1 | 6/2005 | Gopal | |
| 2005/0246082 A1* | 11/2005 | Miki et al. | 701/50 |
| 2005/0263331 A1 | 12/2005 | Sopko et al. | |
| 2006/0061922 A1 | 3/2006 | Mihai et al. | |
| 2007/0080236 A1 | 4/2007 | Betz et al. | |
| 2007/0166168 A1* | 7/2007 | Vigholm et al. | 417/20 |
| 2007/0234718 A1 | 10/2007 | Vigholm | |
| 2008/0157592 A1 | 7/2008 | Bax et al. | |
| 2008/0290842 A1 | 11/2008 | Davis et al. | |
| 2008/0295504 A1 | 12/2008 | Vigholm et al. | |
| 2009/0056324 A1 | 3/2009 | Itakura et al. | |
| 2009/0090102 A1 | 4/2009 | Busse et al. | |
| 2009/0159143 A1 | 6/2009 | Nishikawa et al. | |
| 2010/0097029 A1 | 4/2010 | McCabe | |
| 2010/0156180 A1 | 6/2010 | Nishiyama | |
| 2010/0289443 A1 | 11/2010 | Mazumdar et al. | |

FOREIGN PATENT DOCUMENTS

| | | |
|---|---|---|
| DE | 36 11 553 | 7/1987 |
| DE | 41 02 621 | 8/1992 |
| DE | 699 20 452 | 11/2005 |
| DE | 102005 17 127 | 11/2006 |
| JP | 2000-170687 | 6/2000 |
| JP | 2003-013866 | 1/2003 |
| JP | 2004-100847 | 4/2004 |
| JP | 2008-057687 | 3/2008 |
| JP | 2009-167618 | 7/2009 |
| KR | 10199641737 | 12/1996 |
| KR | 10300305 | 6/2001 |
| WO | WO 90/10850 | 9/1990 |
| WO | WO 2004/074686 | 9/2004 |
| WO | WO 2010/058768 | 5/2010 |

OTHER PUBLICATIONS

International Search Report and Written Opinion for International Application No. PCT/US2010/048257, mail date May 27, 2011, 7 pages.

International Search Report and Written Opinion for International Application No. PCT/US2011/052950, mail date Apr. 16, 2012, 7 pages.

International Search Report and Written Opinion for International Application No. PCT/EP2007/003582, mail date Jan. 30, 2008, 23 pages.

International Search Report and Written Opinion for International Application No. PCT/US2011/052966, mail date Apr. 10, 2012, 9 pages.

Office Action regarding U.S. Appl. No. 13/246,425, mail date Jun. 27, 2013, 8 pages.

* cited by examiner

POWER DEMAND —— GENERATOR SET ----- ULTRA-CAPACITOR —·—·—

ENERGY MANAGEMENT AND STORAGE SYSTEM

BACKGROUND

The present disclosure relates generally to the field of energy management and storage systems. More specifically the present disclosure relates to energy storage systems for operation with heavy equipment for mining, excavating, and construction.

Heavy equipment, such as power shovels and excavators, may include a deck or other platform that rotates above tracks, wheels, pontoons, etc. Extending from the deck, the heavy equipment may further include a boom for an articulated arm or crane designed to operate a bucket, a breaker, a hook, or another form of work implement. Accordingly, such heavy equipment typically includes one or more actuators designed to move the tracks, rotate the deck, and operate the articulated arm and work implement.

Some types of heavy equipment are designed to operate in substantially-repetitive work cycles. By way of example, a power shovel or excavator may typically operate in work cycles that include digging, swinging, dumping, and returning steps for operating a bucket to dig and load fragmented rock, earth, minerals, overburden, and the like for mining purposes. These steps are essentially repeated time and time again, with minor variations to adjust the height at which the bucket engages the ground. The heavy equipment may use hydraulic cylinders or other forms of actuators to perform the lifting, rotating, and lowering movements.

SUMMARY

One embodiment relates to heavy equipment designed for operation in a substantially-repetitive work cycle that includes lifting, rotating, and lowering steps. The heavy equipment includes a generator, an electrical bus, an energy storage component, and working components. The generator provides a substantially constant electrical output to the electrical bus, which is communicated to the working components. As such, the working components of the heavy equipment are driven directly or indirectly by the electrical output of the generator. The controller selectively couples the energy storage component to the electrical bus, and the energy storage component is configured to store electricity provided by the generator, and to provide electricity to the working components by way of the electrical bus. The electrical output of the generator is designed to be less than the power used by the heavy equipment during a portion of the work cycle, and the controller couples the energy storage component to the electrical bus to supplement the electrical output of the generator during the portion of the work cycle in which the electrical output of the generator is less than the power used by the working components of the heavy equipment.

Another embodiment relates to heavy equipment designed for operation in a substantially-repetitive work cycle that includes lifting, rotating, and lowering steps. The heavy equipment includes a generator, working components, an electrical bus, an ultra-capacitor, and a controller. The generator provides an electrical output directly or indirectly to the working components of the heavy equipment, which include an electric motor that is powered by the electrical output of the generator, a hydraulic pump selectively driven by the electric motor, a hydraulic actuator coupled to the hydraulic pump, and an articulated arm configured to be moved by the hydraulic actuator. The electrical bus communicates the electrical output of the generator to the electric motor. The controller couples the ultra-capacitor to the electrical bus, where the ultra-capacitor is configured to selectively store electricity provided by the generator and to selectively provide the electricity to the electric motor by way of the electrical bus. The electrical output of the generator is configured to be less than the power used by the working components during a portion of the work cycle, and the controller couples the ultra-capacitor to the electrical bus to supplement the electrical output of the generator during the portion of the work cycle in which the electrical output of the generator is less than the power used by the working components. The ultra-capacitor is designed to augment the electrical output of the generator by at least 20-percent during the portion of the work cycle in which the electrical output of the generator is less than the power used by the working components.

Yet another embodiment relates to a method of operating heavy equipment. The method includes a step of providing an electrical bus, a generator coupled to the electrical bus, an energy storage component, an electric motor, and an articulated arm. The generator includes an engine coupled to an alternator, and the energy storage component is configured to selectively store from and release electricity to the electrical bus. The electric motor is powered by electricity from the electrical bus, and the articulated arm is configured to be driven directly or indirectly by the electric motor. Another step includes running the engine at a substantially constant speed. Yet another step includes communicating the electrical output of the alternator to the electric motor. Other steps include storing the electrical output from the alternator on the energy storage component, and augmenting the electrical output of the alternator with electricity from the energy storage component. Still other steps include raising at least a portion of the articulated arm, and lowering the portion of the articulated arm.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
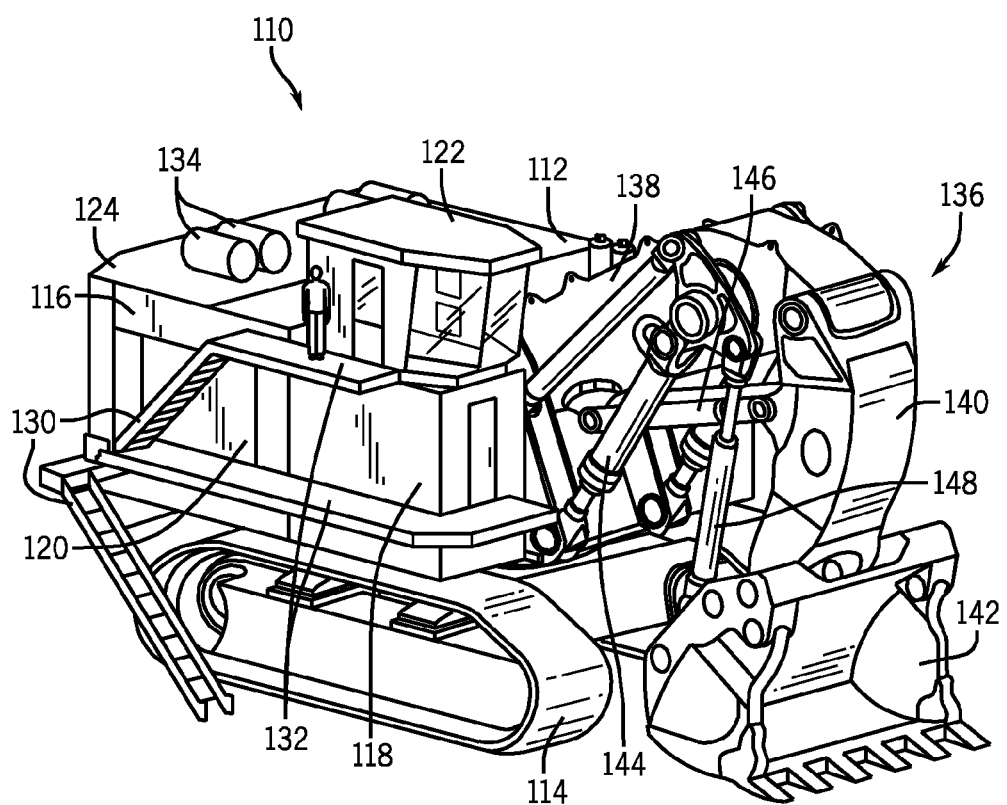
FIG. 1 is a perspective view of a power shovel according to an exemplary embodiment.

Referring to FIG. 1, heavy equipment in the form of a power shovel 110 includes a deck 112 moveable upon tracks 114. The deck 112 further includes a powerhouse 116, an electronic compartment 118 (e.g., e-house), a hydraulic system 120, an operator cab 122, energy storage components 124, and engine and hydraulic cooling systems 126, 128 (see FIG. 2). Various stairwells 130 and walkways 132 may be incorporated with the deck 112 for movement throughout the power shovel 110. Exhaust mufflers 134 are positioned on the deck 112 above the powerhouse 116 and to the rear of the operator cab 122. Extending from the deck 112, the power shovel 110 further includes an articulated arm 136 including a boom 138 rotatably coupled to an arm 140 (e.g., stick), which is rotatably coupled to a bucket 142.

According to an exemplary embodiment, actuators (e.g., linear actuators) in the form of hydraulic cylinders, including a boom cylinder 144, an arm cylinder 146, and a curl cylinder 148, extend between the deck 112 and boom 138 to control movement of the boom 138 relative to the deck 112, between the boom 138 and the arm 140 to control movement of the arm 140 relative to the boom 138, and between the boom 138 and the bucket 142 to control movement of the bucket 142 relative to the arm 140. According to an exemplary embodiment, the hydraulic cylinders 144, 146, 148 are double-acting cylinders, configured to receive hydraulic fluid on both ends of the respective piston. Additional actuators (e.g., electric or hydraulic motors) may be used to propel the power shovel 110 via the tracks 114, and/or to rotate the deck 112 relative to the tracks 114.

Figure 2:
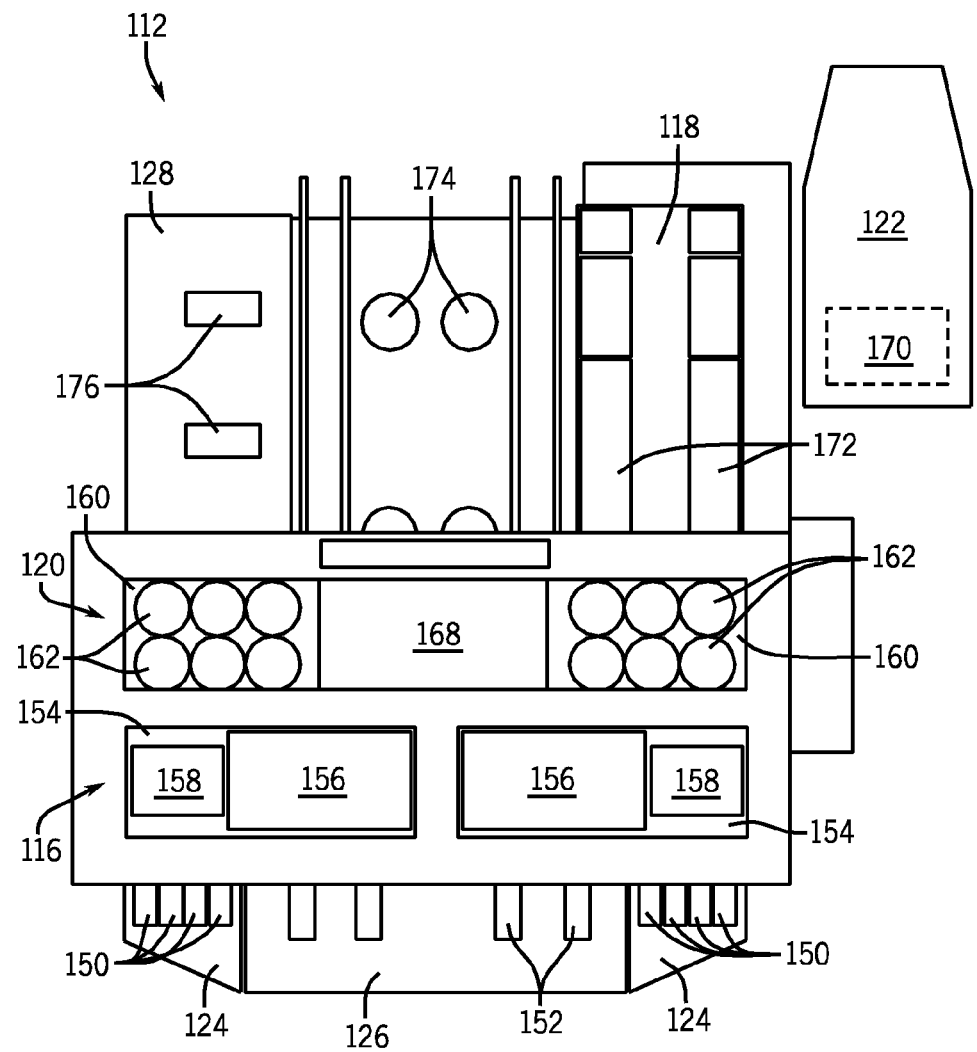
FIG. 2 is a plan view of the power shovel of FIG. 1.
Figure 3:
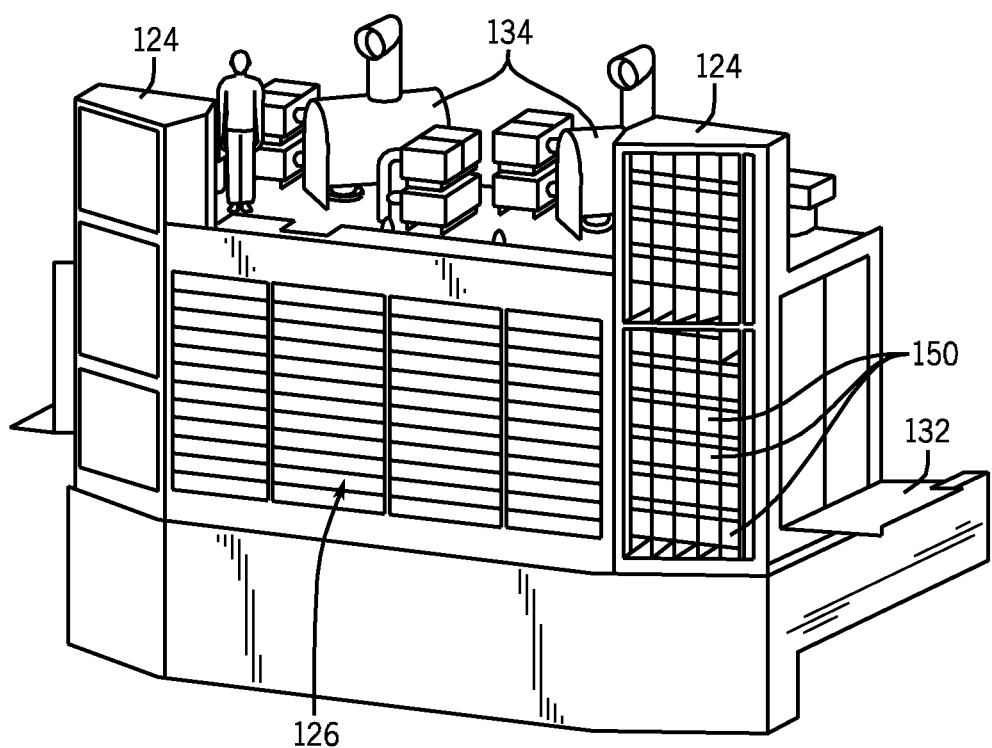
FIG. 3 is a perspective view of a portion of the deck of the power shovel of FIG. 1.

Referring to FIGS. 2-3, by way of example, the deck 112 includes two energy storage components 124 located proximate to the rear corners of the deck 112. In some embodiments the energy storage components 124 include banks of one or more ultra-capacitors 150. In other contemplated embodiments, other forms of energy storage components (e.g., secondary batteries) or other arrangements of energy storage components are used. Also in the rear of the deck 112, an engine cooler system 126, which may include one or more coolant fans 152 and/or blowers, is positioned between the energy storage components 124.

Figure 4:
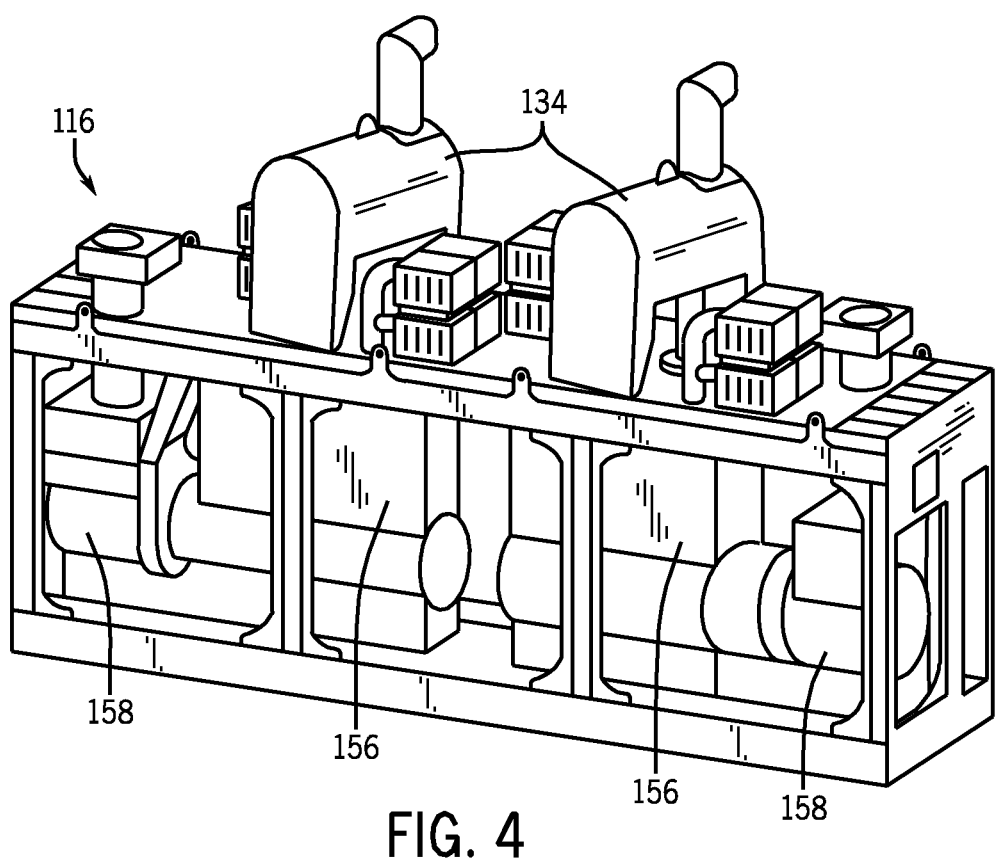
FIG. 4 is a perspective view of generators associated with the power shovel of FIG. 1.
Figure 7:
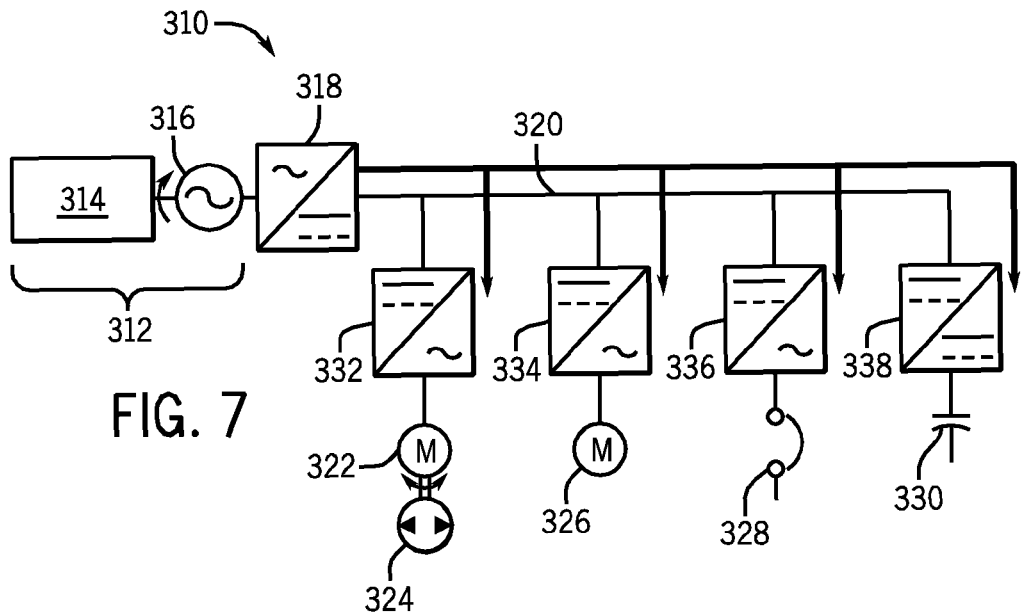
FIG. 7 is a schematic diagram of an energy management system in a first configuration according to an exemplary embodiment.

Referring to now FIGS. 2 and 4, according to such an embodiment, the deck 112 includes the powerhouse 116 in front of the electrical storage components 124. In some embodiments, the powerhouse 116 includes two diesel generator sets 154, each including an engine 156 driving an alternator 158. Rectifiers (see, e.g., rectifier 318 as shown in FIG. 7) may be used to convert alternating current provided by the diesel generator sets 154 to direct current for communication to working components of the power shovel 110 via a direct-current bus (see, e.g., bus 320 as shown in FIG. 7). In other embodiments, other numbers or types of generators are used, such as a single, gasoline-powered generator set. In still other embodiments, electrical power may be supplied over cables from a standalone power plant.

Figure 5:
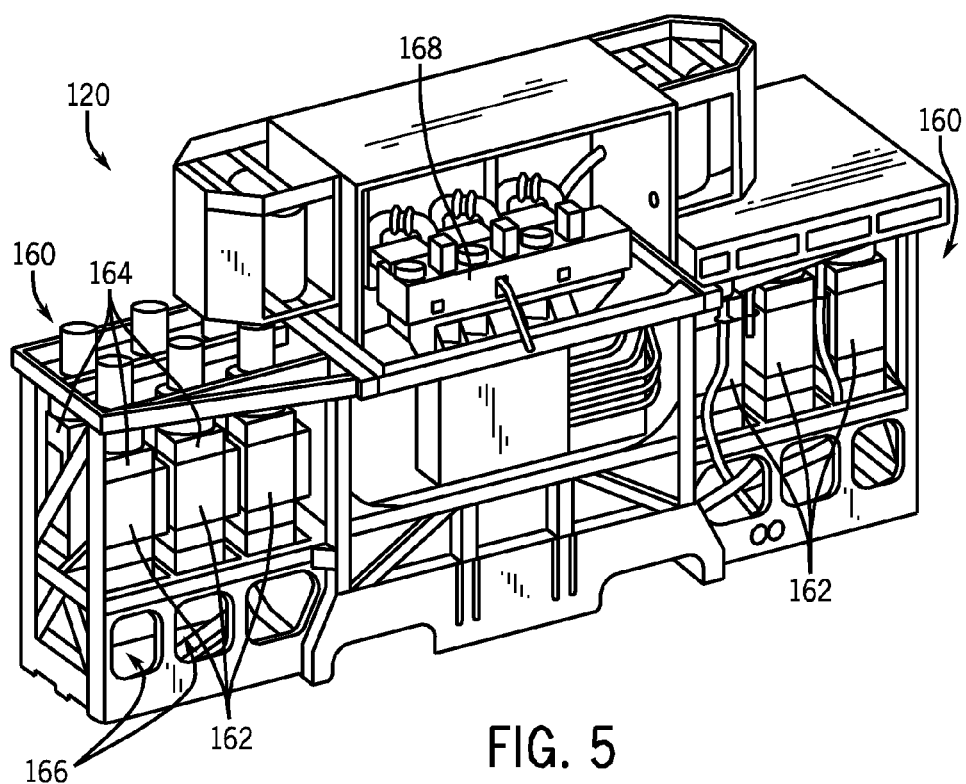
FIG. 5 is a perspective view of a hydraulic system associated with the power shovel of FIG. 1.

Referring to FIGS. 2 and 5, according to such an embodiment, the power shovel 110 includes the hydraulic system 120 for converting the electrical energy provided by the powerhouse 116 to energy of pressurized hydraulic fluid. The pressurized hydraulic fluid may then be used to drive hydraulic actuators, such as hydraulic cylinders 144, 146, 148 and hydraulic motors. In some exemplary embodiments, the hydraulic system 120 includes two groups 160 of six sets 162 of electric motors 164 coupled to hydraulic pumps 166. According to an exemplary embodiment, the pumps 166 are bi-directional, and may provide and receive hydraulic fluid under pressure in two directions.

For each set 162, the speed and direction of the hydraulic pump 166 is controlled by an electrical drive system 172 (e.g., one or more electrical drives and supporting structure, one or more inverters) stored in the electronic compartment 118 and coupled to the electrical bus (see also inverters 332, 334, 336 and bus 320 as shown in FIG. 7). The electrical drive system 172 selectively supplies power to control the speed, direction, and/or torque of the electric motor 164, which drives the hydraulic pump 166. During operation of the power shovel 110, fewer than all of the sets 162 may be operating at one time. In other embodiments, the hydraulic system may include other numbers or arrangements of electric motors and hydraulic pumps.

Still referring to FIGS. 2 and 5, in such an embodiment the sets 162 of hydraulic pumps 166 and electric motors 164 are coupled to a hydraulic valve manifold 168. According to an exemplary embodiment, the hydraulic valve manifold 168 is configured to direct the hydraulic fluid of one or more of the pump and motor sets 162 to and from working components of the power shovel 110. In some embodiments, the hydraulic valve manifold 168 is arranged as a matrix, where each pump and motor set 162 may be selectively coupled to each working component. By way of example, the hydraulic valve manifold 168 may couple the hydraulic fluid provided by two or more pumps to the same working component, such as one of the hydraulic cylinders 144, 146, 148. In some embodiments, the hydraulic valve manifold 168 is positioned between the two groups 160 of pump and motor sets 162.

In some embodiments the hydraulic system 120 is further configured for regeneration of energy associated with the hydraulic fluid. Surplus energy may be provided by the hydraulic fluid, such as when working components of the power shovel 110 are driven by gravity or momentum. Instead of or in combination with braking, the surplus energy of the hydraulic fluid may be conserved (e.g., reused, preserved, utilized). During such an operation, the hydraulic pumps 166 function as hydraulic motors, and are driven by the pressurized hydraulic fluid. The hydraulic pumps 166, in turn, drive the electric motors 164, which generate electricity and provide the electricity to the bus (see, e.g., bus 320 as shown in FIG. 7). If not then needed by other working components, the electricity may be stored via the energy storage components 124.

Referring again to FIG. 2, according to an exemplary embodiment the operator cab 122 includes a control computer 170 that uses logic to operate the power shovel 110 in response to and in conjunction with various inputs, including operator commands (e.g., joystick instructions to crowd bucket, raise boom, etc.), environmental conditions (e.g., sensed terrain slope), internal conditions (e.g., hydraulic fluid temperature, available power, etc.), and other factors. The control computer 170 operates the electrical drive system 172 positioned in the electronic compartment 118, which control the flow of electricity (e.g., amperage, voltage, frequency) from the generator sets 154 to the motor and pump sets 162 and other components, such as slew motors 174 and cooling fans 176 for the hydraulic system 120. In such embodiments, the slew motors 174 directly control rotation of the deck 112 relative to the tracks 114, such as during a swing movement of the power shovel 110.

Figure 6:
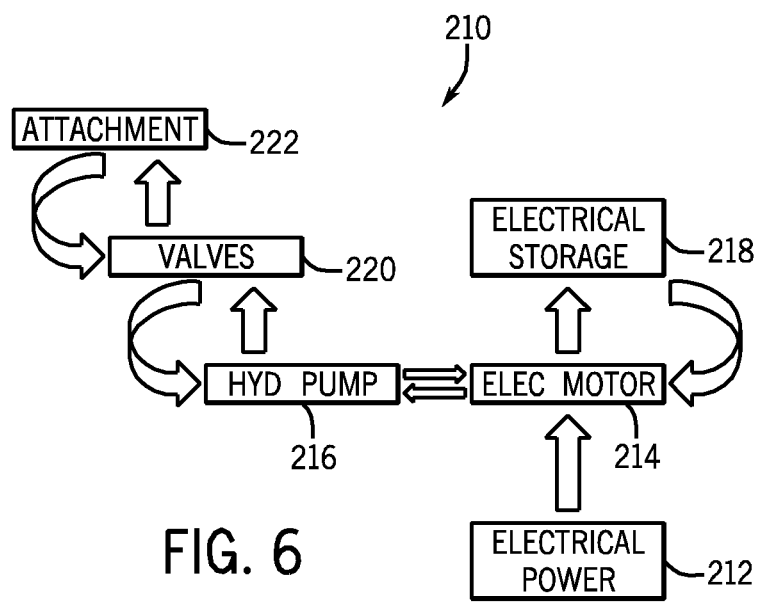
FIG. 6 is a flow chart of an energy management system according to an exemplary embodiment.

Referring now to FIG. 6, an energy management and storage system 210 includes a source 212 of electrical power, an electric motor 214, and a hydraulic pump 216. The electric motor 214 is further coupled to an electrical storage element 218. According to such an embodiment, the electric motor 214 is configured to receive power from both the electrical power source 212 and the electrical storage element 218. In addition, the electric motor 214 is configured to function as a generator and provide electricity to the electrical storage element 218.

During operation of the system 210, the electric motor 214 drives the hydraulic pump 216, which in turn pressurizes hydraulic fluid. The hydraulic fluid is controllably routed by way of valves 220 to one or more working components 222 (e.g., attachments) for operation of the working components 222. When the working components 222 are operating in a manner that uses braking resistance, the hydraulic fluid may be controllably routed through the valves 220 back to the hydraulic pump 216. In such cases, the hydraulic pump 216 may function as a hydraulic motor, driving the electric motor 214 to operate as a generator.

According to an exemplary embodiment, the source 212 of electrical power includes a generator set selected based upon output capacity. During operation of the system 210, the generator set is run at a substantially constant, optimal speed and power output where the speed or output is optimized for the particular generator set with respect to minimum fuel consumption per power output, maximum life of the generator set per power output, minimum maintenance or downtime of the system 210, or other such parameters or combinations of such parameters.

Figure 10:
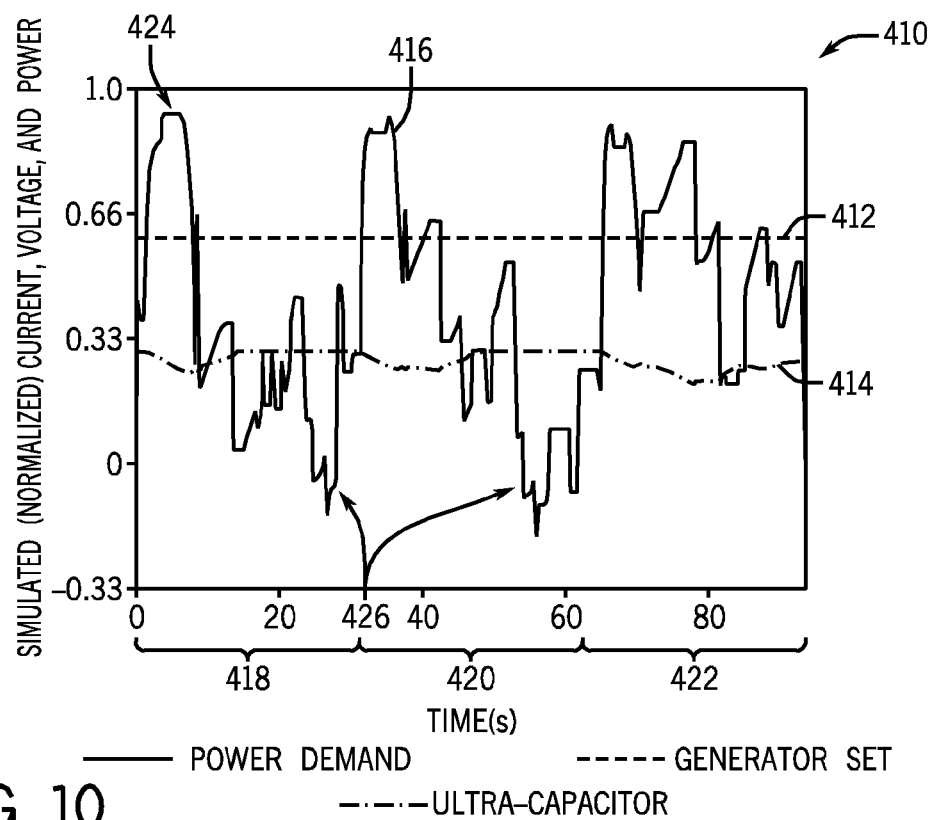
FIG. 10 is a graphical representation of prophetic data provided by a simulation according to an exemplary embodiment.

According to an exemplary embodiment, the generator set, running at the optimal speed, has an electrical output that is less than an expected power need for the system 210 during portions of a work cycle of the system 210. Additional power from the electrical storage element 218 supplements the power of the generator set, allowing the system 210 to meet momentary power demands, while the generator set to still continuously run at the optimal speed and/or power output. In some embodiments, the electrical storage element provides at least 20-percent of the power used by the system during a peak demand portion of the work cycle (compare power demand 416 with generator output 412 as shown in FIG. 10). During other portions of the work cycle, the generator set may produce surplus power, which may be delivered to the electrical storage element 218.

In some embodiments, the generator set of the source 212 is selected such that running at optimal speeds the generator set (or sets) provides the total energy used by the system 210 throughout each work cycle. The supplemental energy provided by the energy storage element 218 during the higher-demand portions of the work cycle is completely offset by the surplus energy provided by the source 212 during the lower-demand portions of the work cycle. Steady-state operation of the generator set at optimal running speeds may not occur during initial cycles of operation for a particular assignment, when the system 210 is moved to a new location, when the system 210 changes tasks, etc. During such times the generator set may be run at above or below optimal speeds.

In other embodiments, the generator set (or sets) is selected such that, at optimal running speeds of the generator set, the source 212 provides less than the total energy used by the system 210 throughout each work cycle. Instead, a portion of the energy required for each work cycle is regenerated from previous work cycles. During initial cycles, the generator set may be run above the optimal power until the capacitor is charged and/or until energy is available from regeneration.

Figure 8:
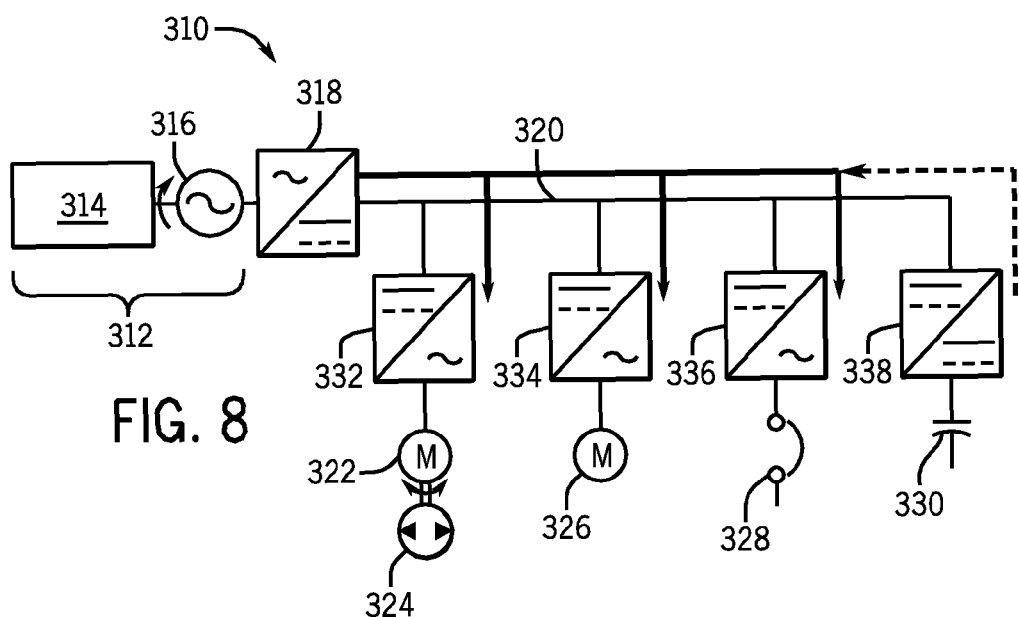
FIG. 8 is a schematic diagram of the energy management system of FIG. 7 in a second configuration.
Figure 9:
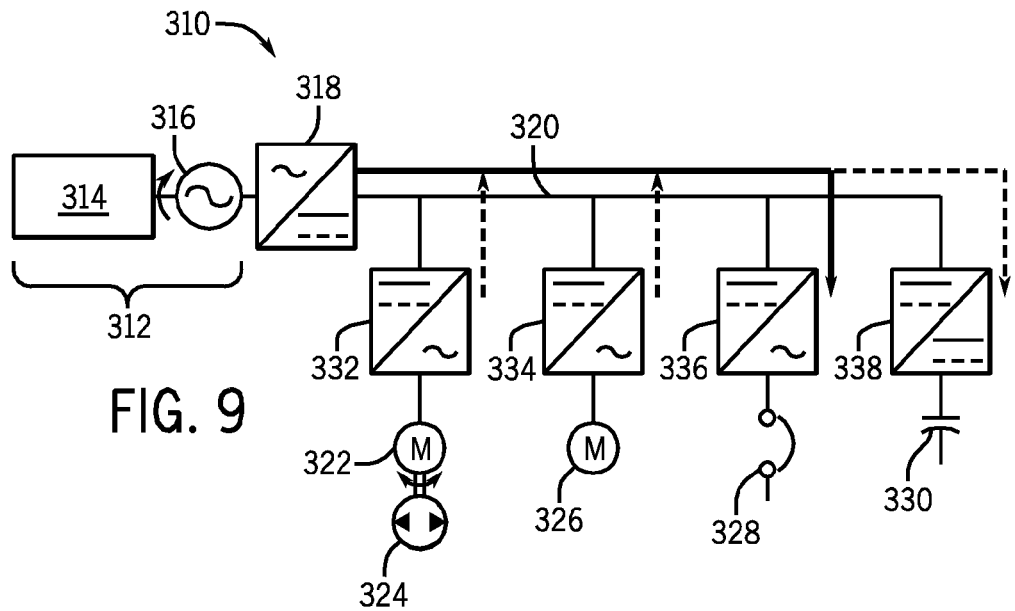
FIG. 9 is a schematic diagram of the energy management system of FIG. 8 in a third configuration.

Referring now to FIGS. 7-9, an energy management and storage system 310 includes a generator set 312 formed from an engine 314 (e.g., internal combustion engine, diesel engine) coupled to an alternator 316. When driven by the engine 314, the alternator 316 provides an electrical output that is converted from alternating current to direct current by a rectifier 318. The electrical output is then provided to a common electrical bus 320 that is in communication with working components of the system 310.

The working components include one or more electric motors 322 coupled to one or more hydraulic pumps 324, one or more additional electric motors 326, and/or auxiliary components 328. An energy storage component 330 (e.g., one or more capacitors) is also coupled to the electrical bus 320. In some embodiments, inverters 332, 334, 336 regulate the electricity to and from the electrical bus 320 to each of the working components. A state-of-charge controller 338 regulates the electricity to and from the electrical bus 320 to the energy storage component 330.

During operation of the system 310, electrical power is supplied from the generator set 312 to the electrical bus 320, and from the electrical bus 320 to the electric motors 322, 326 and auxiliary components 328. During lower-demand periods (e.g., portions of a work cycle) for the system 310 (see FIG. 7), some of the electricity of the electrical bus 320 is directed to the electrical storage component 330. During higher-demand periods (e.g., other portions of the work cycle) for the system 310 (see FIG. 8), power is drawn from the electrical storage component 330 to supplement power from the generator set 312, and is provided to the electric motors 322, 326 and/or auxiliary components 328.

According to an exemplary embodiment, the generator set 312 is run at a substantially constant speed, which produces electricity at a rate below the power required by the motors 322, 326 and auxiliary components 328 during the higher-demand periods. In some such embodiments, the generator set 312 is sized and configured such that the generator set 312 would be unable to satisfy the power requirements for the higher-demand periods (e.g., expected peak loads) without support from the energy storage component 330. So sizing and configuring the generator set 312 is intended to improve the efficiency of the system 310 by reducing the weight of the system 310 (i.e., having a smaller, lighter engine and alternator) and/or optimizing the fuel consumption of the generator set 312 by running the generator set 312 at an efficient speed and reducing production of surplus electricity.

In some embodiments, the system 310 further allows for regeneration of electricity from the electric motors 322, 326 (see FIG. 9). In a contemplated application, gravity acting upon a work implement (e.g., hydraulically actuated articulated arm with bucket) associated with the system 310 provides energy, which may be communicated to the electric motors 322 by way of hydraulic fluid driving the pump 324 coupled to the motors 322. In other contemplated applications, rotational or translational momentum may be recaptured by way of motors 326 coupled to the rotating or translating portions of the system 310 (e.g., slew motors coupled to the rotatable deck of a power shovel) in place of or in conjunction with friction braking. Regeneration of electricity is intended to improve the efficiency of the system and reduce the amount of heat absorbed by the hydraulic system.

Referring now to FIG. 10, by way of a graphical representation 410 of prophetic data produced from a simulation of an energy management and storage system for heavy equipment, relationships are illustrated between energy supplied by a generator set 412, energy held by a bank of ultra-capacitors 414, and energy demand 416 of the heavy equipment. According to the simulation, three work cycles are shown 418, 420, 422, each lasting for approximately thirty seconds (i.e., about 120 per hour).

The cycles 418, 420, 422 show a substantially repetitive oscillatory demand for energy, where the peak demands 424 exceed the substantially constant rate of electricity produced by the generator set 412 (e.g., by about 50%). When the energy demand 416 exceeds the production of the generator set 412, power is drawn from the ultra-capacitors, reducing the amount of energy stored by the ultra-capacitors 414. When the energy demand 416 drops below the level of energy production by the generator set 412, some of the power produced by the generator set is supplied to the ultra-capacitors, recharging the ultra-capacitors. Also during each cycle, the energy demand 416 drops below zero 426, indicating that energy may be regenerated during a portion of the simulated cycles 418, 420, 422.

Although shown with ultra-capacitors in FIG. 10, in other contemplated embodiments, an energy-storage system recaptures energy in one or more hydraulic accumulators, which would then be available as needed to supplement the generator set during peak demand periods. In other contemplated embodiments, a mechanical energy-storage system stores energy in rotating devices of rotational inertia, such as flywheels, or in potential energy of elevated weights. The stored energy would then be released as needed to supplement the main mechanical drives during periods of peak demand.

In other contemplated embodiments, various forms of both stationary and mobile heavy equipment include an energy management and storage system, as described above. The degree of repetitiveness of a work cycle for the heavy equipment may vary as a function of the particular form of heavy equipment and the particular operation or mission to be performed. In some embodiments (e.g., hydraulic drill), a cycle is repeated at a faster or slower rate than the example shown in FIG. 10. In some embodiments, the work cycle or pattern includes more than one peak or period in which energy from an energy storage component supplements an associated generator set.

The construction and arrangements of the energy management and storage system for heavy equipment, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. Heavy equipment configured for operation in a substantially-repetitive work cycle that includes lifting, rotating, and lowering steps, the heavy equipment comprising:
   a generator for providing an electrical output;
   working components of the heavy equipment that are driven directly or indirectly by the electrical output of the generator;
   an electrical bus for communicating the electrical output of the generator to the working components;
   an energy storage component configured to store electricity provided by the generator, and to provide electricity to the working components by way of the electrical bus; and
   a controller for selectively coupling the energy storage component to the electrical bus;
   wherein the electrical output of the generator is configured to be less than the power used by the heavy equipment during a portion of the work cycle;
   wherein the controller couples the energy storage component to the electrical bus to supplement the electrical output of the generator during the portion of the work cycle in which the electrical output of the generator is less than the power used by the working components of the heavy equipment;
   wherein, when a total power used by the heavy equipment throughout the work cycle is less than or equal to a total electrical output of the generator over the work cycle, the generator is operated to provide a first level of electrical output; and
   wherein, when the total power used by the heavy equipment throughout the work cycle is greater than the total electrical output of the generator over the work cycle, (i) a portion of the power used by the heavy equipment during at least some repetitions of the substantially-repetitive work cycle is power that was regenerated during one or more previous repetitions of the work cycle and stored in the energy storage component, and (ii) the generator is operated to charge the energy storage component by providing a second level of electrical output that is greater than the first level during one or more initial repetitions of the work cycle.

2. The heavy equipment of claim 1, wherein the energy storage component is configured to augment the electrical output of the generator by at least 20-percent during the portion of the work cycle in which the electrical output of the generator is less than the power used by the working components of the heavy equipment.

3. The heavy equipment of claim 2, wherein the energy storage component comprises an ultra-capacitor.

4. The heavy equipment of claim 3, wherein the working components comprise an electric motor.

5. The heavy equipment of claim 4, wherein the working components further comprise a hydraulic pump coupled to the electric motor.

6. The heavy equipment of claim 5, wherein the working components further comprise a hydraulic actuator coupled to the hydraulic pump and configured to facilitate movement of the heavy equipment during one or more steps in the work cycle.

7. The heavy equipment of claim 6, wherein at least one of braking energy and gravitational energy is provided by the hydraulic actuator to the hydraulic pump, which drives the electric motor to regenerate electricity, which is received by the electrical bus and delivered to the energy storage component during one or more steps in the work cycle.

8. Heavy equipment configured for operation in a substantially-repetitive work cycle that includes lifting, rotating, and lowering steps, the heavy equipment comprising:
   a generator for providing an electrical output;
   working components of the heavy equipment, comprising:
      an electric motor that is powered by the electrical output of the generator;
      a hydraulic pump selectively driven by the electric motor;

a hydraulic actuator coupled to the hydraulic pump; and
an articulated arm configured to be moved by the hydraulic actuator;
an electrical bus for communicating the electrical output of the generator to the electric motor;
an ultra-capacitor configured to selectively store electricity provided by the generator and to selectively provide the electricity to the electric motor by way of the electrical bus;
a controller for coupling the ultra-capacitor to the electrical bus,
wherein the electrical output of the generator is configured to be less than the power used by the working components during a portion of the work cycle; and
wherein the controller couples the ultra-capacitor to the electrical bus to supplement the electrical output of the generator during the portion of the work cycle in which the electrical output of the generator is less than the power used by the working components;
wherein the ultra-capacitor is configured to augment the electrical output of the generator by at least 20-percent during the portion of the work cycle in which the electrical output of the generator is less than the power used by the working components;
wherein, when a total power used by the heavy equipment throughout the work cycle is less than or equal to a total electrical output of the generator over the work cycle, the generator is operated to provide a first level of electrical output; and
wherein, when the total power used by the heavy equipment throughout the work cycle is greater than the total electrical output of the generator over the work cycle, (i) a portion of the power used by the heavy equipment during at least some repetitions of the substantially-repetitive work cycle is power that was regenerated during one or more previous repetitions of the work cycle and stored in the ultra-capacitor, and (ii) the generator is operated to charge the ultra-capacitor by providing a second level of electrical output that is greater than the first level during one or more initial repetitions of the work cycle.

9. The heavy equipment of claim 8, wherein the generator comprises a diesel engine coupled to an alternator.

10. The heavy equipment of claim 9, wherein the diesel engine is configured to be run at a substantially constant speed during operation of the heavy equipment, regardless of the step of the work cycle.

11. The heavy equipment of claim 10, wherein the substantially constant speed corresponds to a speed of maximum efficiency of the diesel engine.

12. The heavy equipment of claim 10, wherein during one or more steps of the work cycle at least one of braking energy and gravitational energy associated with the articulated arm is communicated to the hydraulic pump by way of the hydraulic actuator, and wherein the hydraulic pump drives the electric motor to regenerate electricity, which is delivered to the ultra-capacitor by way of the electrical bus.

13. The heavy equipment of claim 12, wherein the articulated arm comprises a boom, an arm, and a bucket, wherein the boom is rotatably coupled to the arm, and at least one of the boom and the arm is rotatably coupled to the bucket, and wherein the hydraulic actuator extends between at least one of the boom and the arm, the boom and the bucket, and the arm and the bucket.

14. A method of operating heavy equipment configured for operation in a substantially-repetitive work cycle, comprising steps of:
providing:
an electrical bus;
a generator coupled to the electrical bus, wherein the generator includes an engine coupled to an alternator,
an energy storage component configured to selectively store from and release electricity to the electrical bus,
an electric motor powered by electricity from the electrical bus, and
an articulated arm configured to be driven directly or indirectly by the electric motor;
communicating an electrical output of the alternator to the electric motor;
storing the electrical output from the alternator on the energy storage component;
augmenting the electrical output of the alternator with electricity from the energy storage component;
raising at least a portion of the articulated arm; and
lowering the at least a portion of the articulated arm;
when a total power used by the heavy equipment throughout the work cycle is less than or equal to a total power output of the generator over the work cycle, operating the engine to provide a first level of power output; and
when the total power used by the heavy equipment throughout the work cycle is greater than the total electrical output of the generator over the work cycle:
augmenting the electrical output of the alternator during at least some repetitions of the substantially-repetitive work cycle using power stored in the energy storage component that was regenerated during one or more previous repetitions of the substantially-repetitive work cycle; and
operating the engine to provide a second level of power output higher than the first level of power output during one or more initial repetitions of the work cycle.

15. The method of operating heavy equipment of claim 14, further comprising:
regenerating energy provided by operation of the articulated arm.

16. The method of operating heavy equipment of claim 15, further comprising:
converting the regenerated energy into electricity.

17. The method of operating heavy equipment of claim 16, further comprising:
delivering the regenerated energy to the energy storage component by way of the electrical bus.

18. The method of operating heavy equipment of claim 17, further comprising:
repeating the raising and lowering steps at least 20 times in an hour.

19. The method of operating heavy equipment of claim 18, wherein the energy storage component augments the electrical output of the generator by at least 20-percent.

20. The method of operating heavy equipment of claim 19, wherein the energy storage component comprises an ultra-capacitor.

* * * * *